US012333000B2

(12) United States Patent
Sharpe et al.

(10) Patent No.: US 12,333,000 B2
(45) Date of Patent: Jun. 17, 2025

(54) GENERATING USER GROUP DEFINITIONS

(71) Applicant: Capital One Services, LLC, McLean, VA (US)

(72) Inventors: Samuel Sharpe, Cambridge, MA (US); Christopher Bayan Bruss, Washington, DC (US); Maximo Moyer, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 136 days.

(21) Appl. No.: 18/166,432

(22) Filed: Feb. 8, 2023

(65) Prior Publication Data

US 2024/0265097 A1 Aug. 8, 2024

(51) Int. Cl.
*G06F 21/55* (2013.01)
*G06F 21/60* (2013.01)

(52) U.S. Cl.
CPC .......... *G06F 21/552* (2013.01); *G06F 21/604* (2013.01); *G06F 2221/2151* (2013.01)

(58) Field of Classification Search
CPC ................. G06F 21/552; G06F 21/604; G06F 2221/2151
See application file for complete search history.

(56) References Cited

U.S. PATENT DOCUMENTS

| | | | |
|---|---|---|---|
| 9,942,255 B1* | 4/2018 | MacDermed | H04L 63/1466 |
| 12,088,611 B1* | 9/2024 | Lin | H04L 63/20 |
| 12,126,643 B1* | 10/2024 | Skarphedinsson | H04L 63/10 |
| 12,130,908 B2* | 10/2024 | Ross | G06F 21/554 |
| 2014/0129273 A1* | 5/2014 | Versteeg | G06F 21/604 |
| | | | 705/7.14 |
| 2017/0083703 A1* | 3/2017 | Abbasi | G06F 21/561 |
| 2020/0145824 A1* | 5/2020 | Jones, Jr. | H04B 3/54 |
| 2022/0229906 A1* | 7/2022 | Bálek | G06N 20/00 |

* cited by examiner

*Primary Examiner* — Linglan Edwards
*Assistant Examiner* — Jacob Benedict Knackstedt
(74) *Attorney, Agent, or Firm* — Foley & Lardner LLP

(57) ABSTRACT

Methods and systems are described herein for generating group definition sequences for accounts (e.g., user accounts) using action sequence processing and then classifying accounts using those group definition sequences. A plurality of user account actions and corresponding time that each action was taken may be received and based on that information, a sequence of action types sometimes referred to as a time-ordered dataset of action types (e.g., based on a chronological order of the actions) may be generated. The time-ordered dataset of action types may be compared with known time-ordered sequences for a particular user group or user classification. If the time-ordered dataset of action types matches the time-ordered sequences of the particular user group, the user may be classified into that user group.

20 Claims, 7 Drawing Sheets

500

GENERATING USER GROUP DEFINITIONS

BACKGROUND

In recent years, user classification has become an important task in many fields. For example, classifying users as malicious or benign has become important for access authorization. In another example, classifying users for item recommendations is important for many entities desiring appropriate user interaction (e.g., interaction via electronic channels). Generally, user classification may be performed based on user activity. For example, a system may classify a user as malicious based on a user attempting to access unauthorized information. In another example, a user may be classified as a candidate for particular item recommendations based on other items that the user acquired. However, current classification mechanisms may not be effective in all instances. For example, a particular system may be unable to identify a malicious user account when that user account performs an authorized action but for a malicious purpose. That is, the user account may have been taken over by a malicious user and that malicious user may perform actions that are authorized by that user account. Accordingly, a mechanism is desired to classify user accounts into different groups (e.g., malicious or benign) even when a particular action that a user account performs does not allow for classification.

SUMMARY

Therefore, methods and systems are described herein for generating group definition sequences for accounts (e.g., user accounts) using action sequence processing and then classifying accounts using those group definition sequences. A classification system may be used to perform operations disclosed herein. The classification system may receive a plurality of user account actions and corresponding time that the action was taken and based on that information, generate a sequence of action types sometimes referred to as a time-ordered dataset of action types (e.g., based on a chronological order of the actions). The classification system may then compare the time-ordered dataset of action types with known time-ordered sequences for a particular user group or user classification. If the time-ordered dataset of action types matches the time-ordered sequences of the particular user group, the classification system may classify the user into that user group.

In some embodiments, the classification system may perform the following operations when performing user classification. The classification system may receive a set of actions performed by a user and a set of timestamps corresponding to the set of actions. For example, a logging system may log various actions performed by a user account with respect to a computing environment. Some actions may include login, logout, access a particular file or folder, download a particular number of files or bytes, upload to a particular folder or upload a particular number of bytes, and other suitable actions. Each action may include action parameters and a timestamp of when the particular action was performed. In one example, the logging system may log that a user downloaded a particular set of files from a particular folder. The action may be "download" while the parameters may include file names, folder name(s), number of bytes, and other suitable parameters. A timestamp may correspond to a time when the action was initialized.

Based on the received set of actions, the classification system may determine, for each action of the set of actions, a corresponding action type of a plurality of action types. The classification system may store a plurality of action types. For example, one action type may correspond to an action requesting to download bytes greater than one million, while another action may be a request to download a number of files greater than twenty. Other examples of actions are also contemplated. Actions may involve deleting files greater than a particular number or writing more than a particular number of bytes. Other types of actions may include logging into a number of systems greater than a particular number, and other suitable actions.

When the actions are classified by type, the classification system may generate a time-ordered dataset that includes a set of action types corresponding to the set of actions. The set of action types may be ordered based on the set of timestamps. For example, if a set of action types includes one hundred actions, those actions may be ordered based on a time the action occurred as indicated by a timestamp (e.g., in an earliest to latest order). Thus, the set of action types may be one long sequence of action types associated with actions performed by a user or a user account.

The classification system may also retrieve a plurality of time-ordered sequences associated with a first group label. For example, malicious users (e.g., hackers that take control of a user account) may perform one or more particular sequences of action types. The classification system may identify those sequences and stores those sequences. The classification system may then retrieve those sequences when attempting to classify a particular user account.

The classification system may then determine whether one or more time-ordered sequences of the plurality of time-ordered sequences associated with the first group label are found within the time-ordered dataset. For example, the classification system may iterate through each sequence and determine whether that sequence exists within the time-ordered set. In some embodiments, the classification system may determine how many times the one or more time-ordered sequences are found within the time-ordered dataset. When the one or more time-ordered sequences are found within the dataset, the classification system may determine that the user account is part of a group (e.g., the user account has been hacked or taken over by a malicious user).

Based on determining that the plurality of time-ordered sequences associated with the first group label are found within the time-ordered dataset, the classification system may label the user with the first group label. For example, the classification system may add the user account to a group of malicious user accounts or to another suitable group. The classification system may then perform an action with respect to the user based on the user being associated with the first group label. For example, the classification system may restrict the user (e.g., the user account) from performing certain operations. In some embodiments, the classification system may disable the user account or otherwise suspend the user account from being able to perform any actions.

In some embodiments, the classification system may generate the one or more time-ordered sequences for a particular group so that those time-ordered sequences may be used to identify users or use accounts to be added to that group. In particular, the classification system may receive a dataset that includes a plurality of actions performed by a plurality of users and corresponding timestamps for the plurality of actions. A first subset of the plurality of users may be associated with the first group label and a second subset of the plurality of users is associated with a second group label. For example, a first label (e.g., first user group) may be associated with malicious user accounts, while a second label (e.g., second user group) may be associated with benign user accounts. In some embodiments, the received sets of actions and timestamps may be per user account indicating actions of user accounts. Some of the user accounts have been found to be malicious, while others may have been found to be benign.

The classification system may determine, for each action of the plurality of actions, the corresponding action type of the plurality of action types. As discussed above, the actions may include an action requesting to download bytes greater than one million, a request to download a number of files greater than twenty and other suitable download actions. Furthermore, actions may involve deleting files greater than a particular number or writing more than a particular number of bytes. Other types of actions may include logging into a number of systems greater than a particular number and other suitable actions. In some embodiments, a first set of action types may include a first plurality of subsets of actions with each subset of actions in the first plurality of subsets of actions including actions of each corresponding user. Furthermore, a second set of action types may include a second plurality of subsets of actions with each subset of actions in the second plurality of subsets of actions including actions of each corresponding user. For example, the first plurality of subsets may include actions of accounts known to be malicious (e.g., hacked accounts) while the second plurality of subsets may include actions of accounts known to be benign (e.g., regular user accounts).

The classification system may input, into a sequence determination function for the first subset, the first set of action types arranged using a set of corresponding timestamps, to obtain a first plurality of time-ordered sequences of actions common to the first subset of the plurality of users. The sequence determination function may detect time-ordered sequences of actions within datasets of action types and corresponding timestamps. For example, the sequence determination system may user encoder-decoder models (e.g., Seq2Seq) to perform the determination. In some embodiments, the classification system may use a neural network or another machine learning model to perform sequence detection. Thus, the sequence determination function may identify sequences that are common to accounts having a first label (e.g., malicious accounts).

The classification system may then input, into the sequence determination function for each user of the second subset, a second set of action types and a second set of corresponding timestamps, to obtain a second plurality of time-ordered sequences of actions common to the second subset of the plurality of users. The sequence determination function may determine a set of sequences for the second subset in the same manner as for the first subset. For example, the sequence determination function may identify sequences that are common to benign user accounts (e.g., regular user accounts).

The classification system may then identify a set of time-ordered sequences within the first subset of time-ordered sequences that do not match the second subset of time-ordered sequences. That is, the classification system may identify time-ordered sequences that are common to both malicious and benign accounts and then remove those sequences from the set of time-ordered sequences that identify malicious accounts. Thus, the sequences that are common to both types of accounts do not differentiate malicious and benign accounts. The classification system may then assign the set of time-ordered sequences to the first group label. Once the set of time-ordered sequences is assigned to a corresponding first group label, those sequences may be used in user identification and classification.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
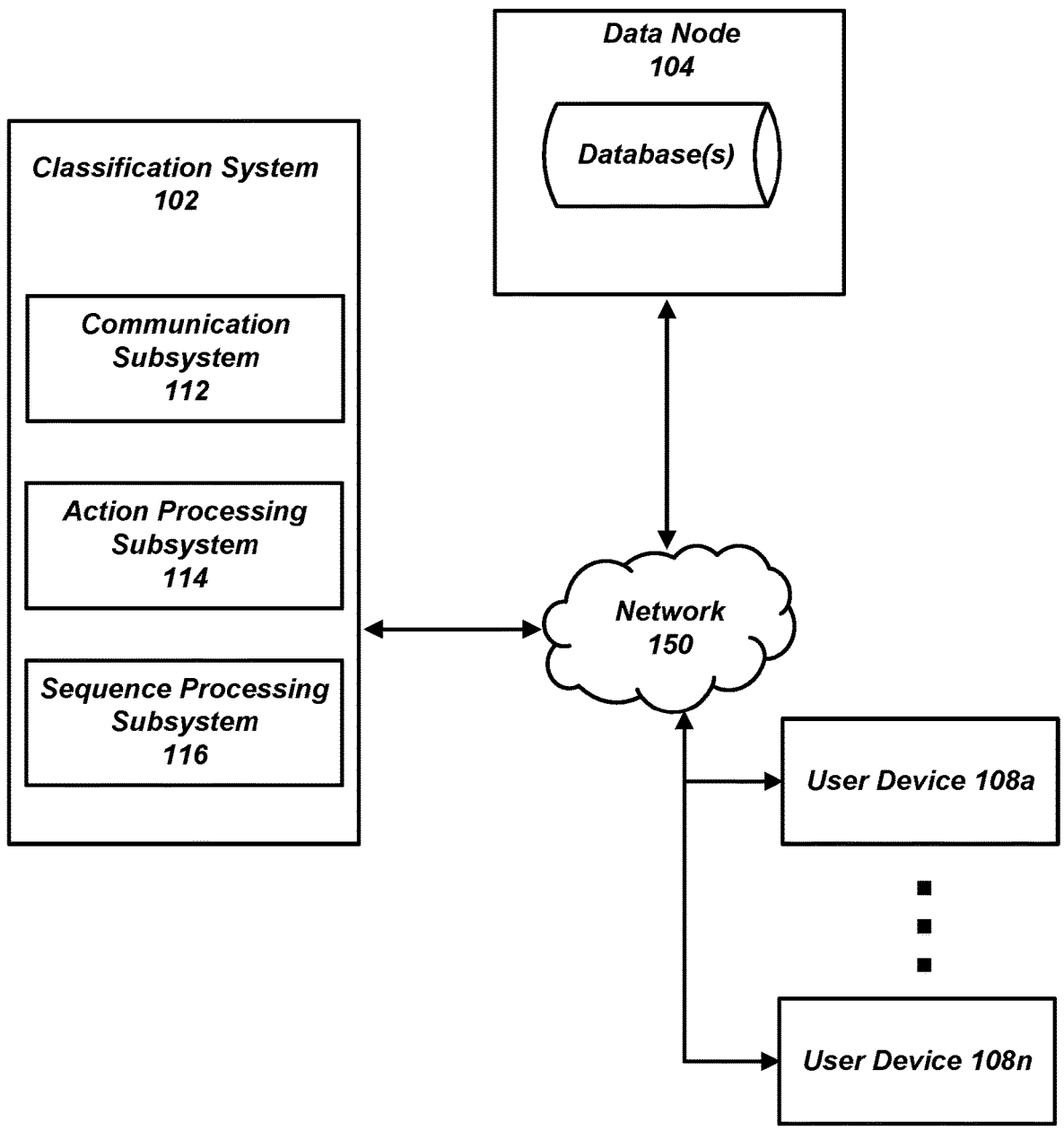
FIG. 1 shows an illustrative system for generating group definition sequences for users using action sequence processing and then classifying accounts using those group definition sequences, in accordance with one or more embodiments of this disclosure.

FIG. 1 is an example of environment 100 for generating group definition sequences for users using action sequence processing and then classifying accounts using those group definition sequences. Environment 100 includes classification system 102, data node 104, and user devices 108a-108n. Classification system 102 may execute instructions for generating group definition sequences for users using action sequence processing and then classifying accounts using those group definition sequences. Classification system 102 may include software, hardware, or a combination of the two. For example, classification system 102 may reside on a physical server or a virtual server that is running on a physical computer system. In some embodiments, classification system 102 may be configured on a user device (e.g., a laptop computer, a smart phone, a desktop computer, an electronic tablet, or another suitable user device).

Data node 104 may store various data, including time-ordered sequences representing class or group definitions, sequence type data, user action data, and/or other suitable data. Data node 104 may include software, hardware, or a combination of the two. For example, data node 104 may be a physical server or a virtual server that is running on a physical computer system. In some embodiments, classification system 102 and data node 104 may reside on the same hardware and/or the same virtual server/computing device. Network 150 may be a local area network, a wide area network (e.g., the Internet), or a combination of the two. User devices 108a-108n may be end-user computing devices (e.g., desktop computers, laptops, electronic tablets, smart phones, and/or other computing devices used by end users). In some embodiments, each user device may be used by a particular user to perform actions in relation to user accounts.

Classification system 102 may receive (1) a set of actions performed by a user and (2) a set of timestamps corresponding to the set of actions. Classification system 102 may receive the set of actions and the set of timestamps using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the set of actions and the set of timestamps from data node 104 or from another computing device. In some embodiments, each user may perform actions using one or more user devices 108a-108n. Those actions may be recorded on those client devices and/or servers that interface with the client devices. The actions may be timestamped and stored on a server and/or sent to data node 104.

In some embodiments, the actions may be actions that a user performs in relation to a financial account (e.g., a credit card account, a bank account, or another suitable account). For example, a set of actions may include buying items over one thousand dollars, buying electronic items, disputing charges, paying a bill, depositing currency, and/or other suitable actions. Whenever a user performs an action, a system processing the action may add a timestamp to the action (i.e., the system may record a time the action occurred). Accordingly, classification system 102 may receive (e.g., via communication subsystem 112) actions corresponding to a particular financial account with associated timestamps. The actions may be received with other parameters (e.g., total number of dollars spent, location, merchant information, etc.). Communication subsystem 112 may pass the received data or a pointer to the received data (e.g., a pointer to a memory location), to action processing subsystem 114.

Action processing subsystem 114 may include software components, hardware components, or a combination of both. For example, action processing subsystem 114 may include software components (e.g., software functions) that access data in physical memory and use one or more processors to perform operations described herein. Action processing subsystem 114 may access the plurality of actions and associated data, for example, in memory.

Figure 2:
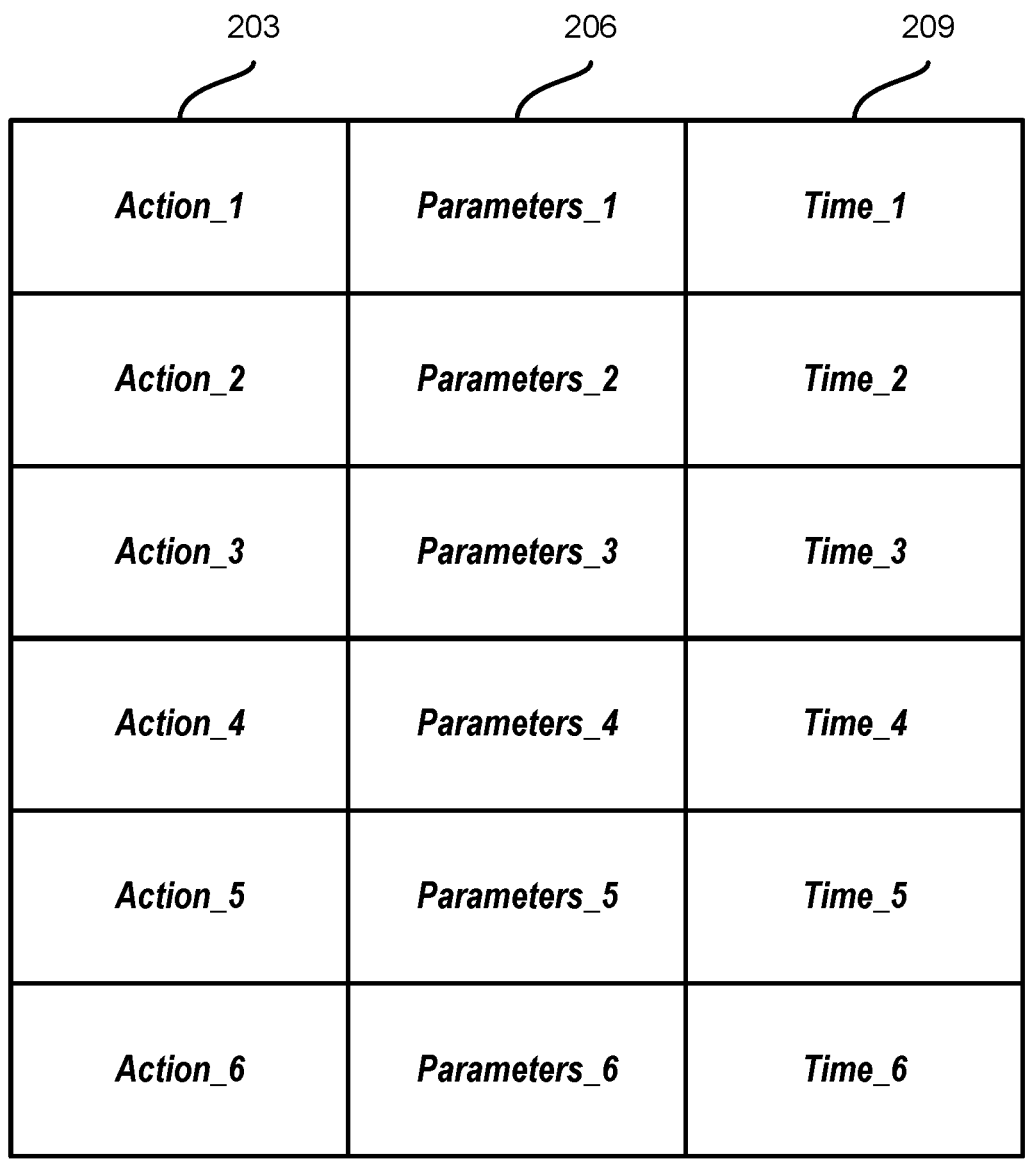
FIG. 2 illustrates a portion of a data structure for user actions and associated parameters, in accordance with one or more embodiments of this disclosure.

FIG. 2 illustrates a portion of a data structure for user actions and associated parameters. Data structure 200 may include column 203 that may store various actions that the user performed. For example, column 203 may store actions, such as purchase (e.g., purchase an item with a credit or a debit card), withdraw (e.g., withdraw currency from a credit card or a checking account), or other suitable actions. Column 206 may include parameters of the action. For example, parameters may include an amount of currency withdrawn, the price of an item purchased, a type of an item purchased, merchant information, and or other suitable parameters. Column 209 may include timestamps corresponding to a time when a particular action was performed. The timestamp may be a specific time or a range of times. For example, if an action started at a particular time and ended at a particular time, the time range may be added. The time range may be added for actions described with respect to computing system access and usage (e.g., download command that takes time, upload command that takes time, or another suitable command). The timestamp for a specific time may be used for single execution command (e.g., a withdrawal action, a purchase action, or another suitable action).

When the actions for the user are received, action processing subsystem 114 may classify each action into a particular action type. In particular, action processing subsystem 114 may determine, for each action of the set of actions, a corresponding action type of a plurality of action types. For example, classification system 102 may store a plurality of definitions for a plurality of action types. As described above, in relation to a computing environment embodiment, the action types may include "bytes read over a particular number," "bytes written over a particular number," "number of files requested to download," and/or other suitable action types. For financial account embodiments, action types may include purchase over a particular amount of currency (e.g., over one thousand dollars), purchase of a particular type of item (e.g., electronics), withdrawal over a particular amount, and/or other suitable action types. In some embodiments, each action type may be associated with multiple requirements. For example, an action type may require that a particular purchase be over one thousand dollars and be a purchase of an electronic item. Thus, each action type may have an associated definition.

In some embodiments, action processing subsystem 114 may perform the following operations when identifying or determining an action type for each action. Action processing subsystem 114 may start processing each action to assign an action type. In particular, action processing subsystem 114 may retrieve a first action identifier and one or more action parameters for a first action in the set of actions. In some embodiments, action processing subsystem 114 may retrieve actions based on the timestamps starting from the earliest to the latest or from the latest to the earliest. Each action may be stored in a database (e.g., on data node 104 or on another suitable device) in a data structure (e.g., a table). Thus, action processing subsystem 114 may retrieve the first action and associated parameter data from that data source.

Action processing subsystem 114 may then retrieve the plurality of action types. Each action type of the plurality of action types may include a corresponding set of action type parameters. The action type parameters may correspond to action type definitions for the corresponding action type. When the action types have been retrieved, action processing subsystem 114 may attempt to match an action to an action type (e.g., based on action type definitions). Thus, action processing subsystem 114 may determine whether the first action identifier and the one or more action parameters match a first action type of the plurality of action types and the corresponding set of action type parameters. For example, each action type parameter within the action type definition may be mapped to a particular action parameter stored with the action (e.g., parameters illustrated in FIG. 2). Thus, when performing the determination action, processing subsystem 114 may compare the parameters based on the mapping. To continue with the example above, if the action types are based on a computing environment embodiment, action processing subsystem 114 may retrieve a first action type parameter that may indicate an action type (e.g., action type of download). Another action type parameter may be "greater than one thousand megabytes" and the third action type parameter may be "server_1". Thus, action processing subsystem 114 may match the "download" action type to "download" the action identifier for the first action. Action processing subsystem 114 may continue matching parameters and determine whether all parameters have matched. If all parameters match, action processing subsystem 114 may determine that the action matches a particular action type.

A similar matching process may be performed in financial embodiments. An action type definition in a financial embodiment may include a type of transaction (e.g., a purchase), a minimum amount (e.g., a thousand dollars), a type of item (e.g., electronics), and/or other suitable action type parameters. These parameters may be mapped to the action parameters and may be compared as discussed above. If all parameters match, action processing subsystem 114 may determine that the action matches a particular action type. Based on determining, that the first action identifier and the one or more action parameters match the first action type of the plurality of action types and the corresponding set of action type parameters, action processing subsystem 114 may add the first action type to the time-ordered dataset.

In some embodiments, action processing subsystem 114 may compare the timestamp of the action being processed with timestamps of the actions with associated types already in the time-ordered dataset to determine a position within the time-ordered dataset for the action type corresponding to the first action. In particular, action processing subsystem 114 may retrieve a timestamp associated with the first action in the set of actions and determine, based on the timestamp and the set of timestamps associated with the set of actions within the time-ordered dataset, a position within the time-ordered dataset for the first action. In some embodiments, action processing subsystem 114 may iterate through each action in the time-ordered dataset and determine the position for adding the first action type. Thus, action processing subsystem 114 may add the first action type to the time-ordered dataset according to the position.

Figure 3:
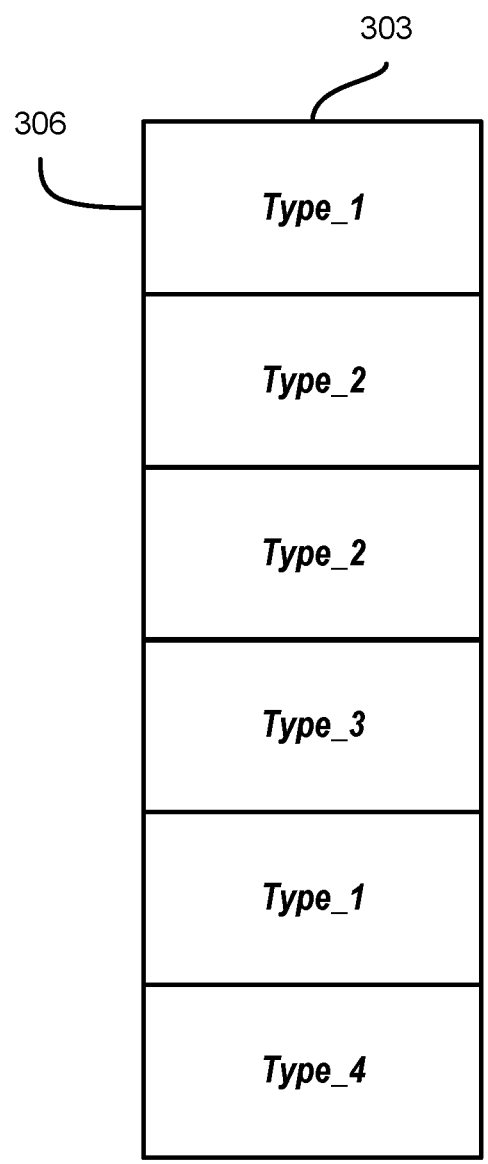
FIG. 3 illustrates an excerpt of a data structure representing a time-ordered sequence of action types, in accordance with one or more embodiments of this disclosure.

Thus, action processing subsystem 114 may generate a time-ordered dataset that includes a set of action types corresponding to the set of actions. The set of action types may be ordered based on the set of timestamps. FIG. 3 illustrates an excerpt of a data structure representing a time-ordered sequence of action types. Data structure 300 may include column 303 of action types 306. Other information may be added to data structure 300 (e.g., timestamps and/or other parameters). The action types may be time-ordered, for example, in chronological or reverse chronological order. Once the actions have been processed into a time-ordered dataset, the time-ordered dataset may be stored in memory and/or on data node 104. In some embodiments, action processing subsystem 114 may pass the time-ordered dataset or a pointer to the time-ordered dataset to sequence processing subsystem 116.

Figure 4:
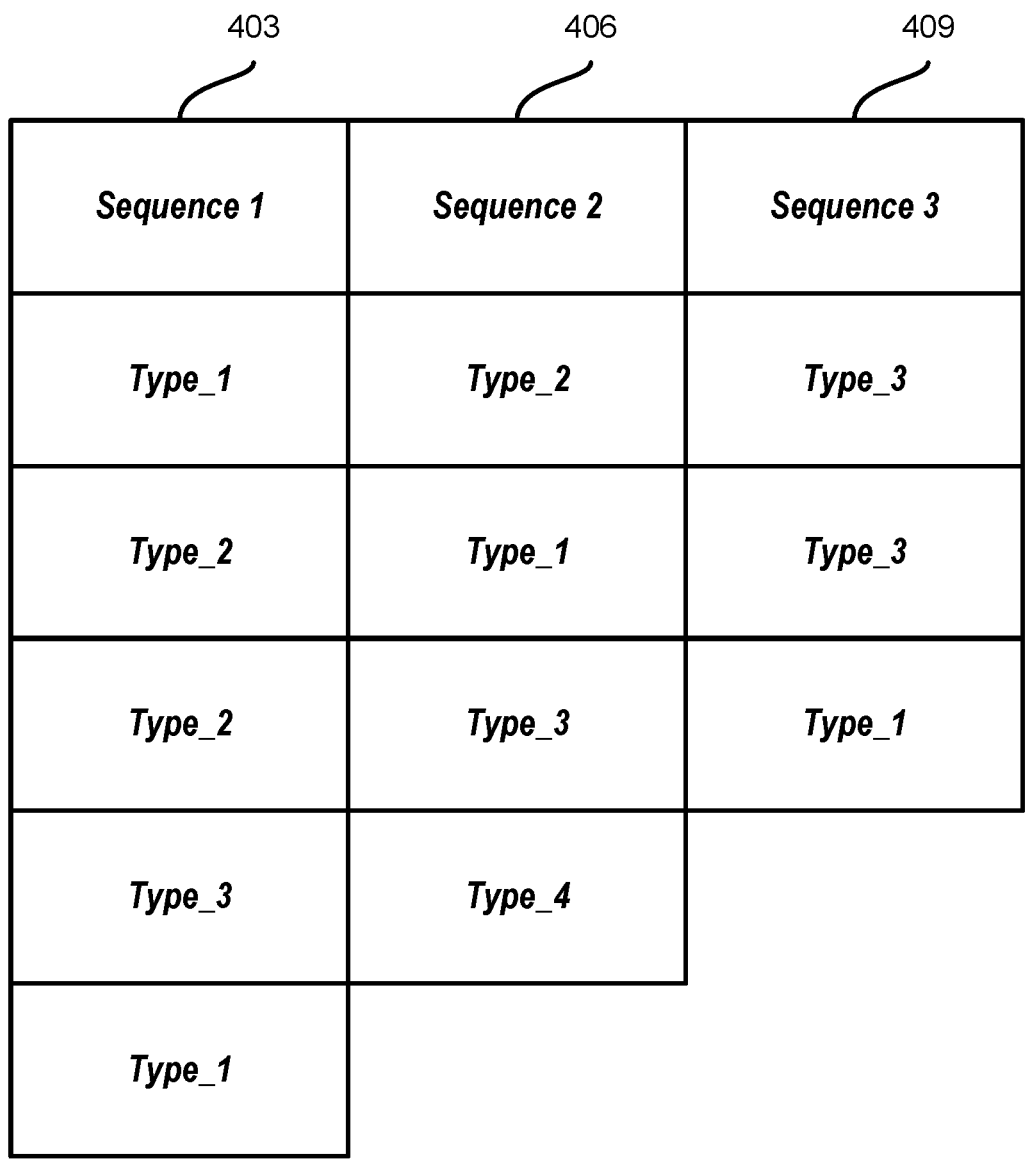
FIG. 4 illustrates time-ordered sequences of action types for a particular classification, in accordance with one or more embodiments of this disclosure.

Sequence processing subsystem 116 may include software components, hardware components, or a combination of both. For example, sequence processing subsystem 116 may include software components that access data in memory and/or storage, and may use one or more processors to perform its operations. Sequence processing subsystem 116 may process the generated time-ordered dataset to classify the user (e.g., the user account). Thus, sequence processing subsystem 116 may retrieve a plurality of time-ordered sequences associated with a first group label. The time-ordered sequences may be stored in memory and/or data node 104. Each group label may be stored with an associated plurality of time-ordered sequences. In some embodiments, only one sequence may be associated with a group label. FIG. 4 illustrates a data structure 400 of time-ordered sequences of action types for a particular classification. FIG. 4 illustrates sequence 403, sequence 406, and sequence 409. Each sequence may include a plurality of action types. The time-ordered sequences may be of different length.

When sequence processing subsystem 116 retrieves the plurality of time-ordered sequences for the first group label, sequence processing subsystem 116 may use those time-ordered sequences to classify the user associated with the received set of actions. In particular, sequence processing subsystem 116 may determine whether one or more time-ordered sequences of the plurality of time-ordered sequences associated with the first group label are found within the time-ordered dataset. For example, sequence processing subsystem 116 may iterate through each time-ordered sequence associated with a particular group label, a particular classification, or a particular category and compare each sequence with the action types within the time ordered dataset. In some embodiments, sequence processing subsystem 116 may select, within each time-ordered sequence, action types in sequence and search for each action type within the time-ordered dataset. If the first action type is located within the time-ordered dataset, sequence processing subsystem 116 may select a second action type and search the time-ordered dataset for the next action type. However, sequence processing subsystem 116 may search the time-ordered dataset starting at the position of the first action type. If the second action type is located, sequence processing subsystem 116 may continue searching each action type in order until the sequence is found or until an action type is not found.

In some embodiments, sequence processing subsystem 116 may not need to match every sequence to the time-ordered dataset to classify the corresponding user or user account, but instead may only require that one or more time-ordered sequences match. Thus, sequence processing subsystem 116 may perform the following operations when determining whether the one or more time-ordered sequences associated with the first group label are found within the time-ordered dataset. Sequence processing subsystem 116 may determine a number of time-ordered sequences associated with the first group label that match the time-ordered dataset. For example, sequence processing subsystem 116 may determine that there are a total of four time-ordered sequences associated with a particular group label (or a particular classification) and that three of those four time-ordered sequences matched the sequences within the time-ordered dataset.

Sequence processing subsystem 116 may then determine a ratio of a first set of time-ordered sequences that match to a second set of time-ordered sequences that do not match. For example, if three of four time-ordered sequences matched, sequence processing subsystem 116 may determine that the ratio is 3/4. In some embodiments, the ratio may be a percentage (e.g., 75%). Sequence processing subsystem 116 may determine a match based on the ratio meeting a threshold. For example, a threshold may be 75%, thus sequence processing subsystem 116 may determine that there is a match.

Based on determining that the plurality of time-ordered sequences associated with the first group label are found within the time-ordered dataset, sequence processing subsystem 116 may label the user with the first group label. For example, if sequence processing subsystem 116 determines that the time-ordered dataset matches a label for malicious accounts or malicious users, sequence processing subsystem 116 may add a tag to the account that the user account is malicious. Sequence processing subsystem 116 may then perform an action with respect to the user based on the user being associated with the first group label. For example, if sequence processing subsystem 116 determines that the user account is malicious or otherwise has been hacked or compromised, sequence processing subsystem 116 may disable the user account or otherwise restrict the user account (e.g., restrict withdrawals from the financial account).

In some embodiments, there may be a multitude of classifications with each classification assigned a particular restriction or a particular set of restrictions. Thus, sequence processing subsystem 116 may determine a restriction level associated with the first group label, and apply the restriction level associated to an account of the user. For example, sequence processing subsystem 116 may retrieve a set of restrictions associated with a corresponding restriction level (e.g., from memory) and update a user account with those restrictions.

Prior to using group definition for classifying users (e.g., user accounts) into groups based on actions associated with those users, classification system 102 may generate those group definitions. Classification system 102 may generate user group definitions based on user actions using the following operations. Classification system 102 may receive (e.g., via communication subsystem 112) a dataset that includes a plurality of actions performed by a plurality of users. The dataset may include a first subset of the plurality of users associated with the first group label and a second subset of the plurality of users associated with a second group label. Each action within the dataset may be associated with a timestamp representing a time when the action was performed or initiated. The timestamps may be included within the dataset. For example, an action may be a request to download a particular set of files. In another example, an action may be a purchase using a credit card.

In some embodiments, the first subset of users may represent actions of malicious users (e.g., hacked accounts) while the second subset may represent actions of regular users. The database may be arranged such that each user action corresponds to an entry where each entry includes a user identifier associated with the entry and an indication whether the entry is associated with a malicious user or a benign user (e.g., regular user). Other parameters may be associated with each entry as indicated in FIG. 2. In addition, each entry may include an action identifier as discussed above.

Communication subsystem 112 may pass the received dataset to action processing subsystem 114. Action processing subsystem 114 may process the received actions together with the action parameters to determine an action type for each action. In particular, action processing subsystem 114 may determine, for each action of the plurality of actions, a corresponding action type of a plurality of action types. In some embodiments, a first set of action types may include a first plurality of subsets of actions with each subset of actions in the first plurality of subsets of actions including actions of each corresponding user. A second set of action types may include a second plurality of subsets of actions with each subset of actions in the second plurality of subsets of actions including actions of each corresponding user. As discussed above, action processing subsystem 114 may select each action (e.g., each action identifier and associated action parameters) and compare that information with action type definitions. For example, if the action types are based on a computing environment embodiment, an action type definition may include an action type (e.g., action type of download) and one or more parameters (e.g., greater than one thousand megabytes). Another action type parameter may be an identification of a server system where the action was requested by the user account (e.g., "server_1"). An action type definition in a financial embodiment may include a type of transaction (e.g., a purchase), a minimum amount (e.g., a thousand dollars), a type of item (e.g., electronics), and/or other suitable action type parameters. These parameters may be mapped to the action parameters and may be compared as discussed above.

In some embodiments, action processing subsystem 114 may iterate through each entry and determine an action type for that entry. In particular action processing subsystem 114 may retrieve a plurality of action type definitions (e.g., as described above). Each action type definition may include an action identifier and/or one or more action type parameters as described above. Those action type parameters may be mapped to action parameters. Thus, action processing subsystem 114 may attempt to match each action and associated parameters with an action type (e.g., as defined by the action type identifier and action type parameters). In some embodiments, action processing subsystem 114 may generate a data structure for each user that may store the action types. The action types may be stored in chronological order (e.g., based on a corresponding timestamp). When the matching process is completed, each set of actions for a particular user may have associated action types. Thus, each user within the dataset may be represented by a time-ordered sequence of action types. Action processing subsystem 114 may generate a dataset or another suitable data structure for the action types. For example, a first subset of action types may be a subset of action types for known malicious users (e.g., hacked user accounts) and a second subset of action types may be a subset of action types for known benign users (e.g., regular user accounts). Thus, each user class may include a set of users, with each user represented by a time-ordered sequence of action types.

Action processing subsystem 114 may transmit the time-ordered sequences of action types to sequence processing subsystem 116. Sequence processing subsystem 116 may process the time-ordered sequences to generate class definitions. In particular, sequence processing subsystem 116 may input, into a sequence determination function for the first subset, the first set of action types arranged according to a first set of corresponding timestamps, to obtain a first plurality of time-ordered sequences of actions common to the first subset of the plurality of users. The sequence determination function may detect time-ordered sequences of actions within datasets of action types and corresponding timestamps. For example, the first set of action types may be action types associated with malicious accounts (e.g., hacked accounts). Thus, the sequence determination function may find action sequences common to users in the first subset of the plurality of users (e.g., sequences common to malicious users).

In some embodiments, the sequence determination function may be an algorithm that scans sets of time-ordered action types associated with different users and finds time-ordered sequences common to those users. For example, a time-ordered sequence that is common for users may be a time-ordered sequence that exists in five percent or ten percent of time-ordered action types associated with a class of users. For example, if there are one thousand users within a dataset and fifty users (e.g., five percent) within that dataset share a common time-ordered sequence, the sequence determination function may determine that the time-ordered sequence is a common time-ordered sequence for that dataset.

In some embodiments, the sequence determination function may iterate through a time-ordered set of action types for each user and determine for each other user (e.g., based on corresponding time-ordered action types) whether any time-ordered sequences are common to those users (e.g., accounts). The sequence determination function may continue iterating through each user's corresponding time-ordered action types to determine how common each time-ordered sequence is within a particular dataset. For example, if a time-ordered sequence occurs in five percent of time-ordered action types (e.g., corresponding to five percent of users), sequence processing subsystem 116 may determine that the time-ordered sequence is common to that class of users.

In some embodiments, sequence processing subsystem 116 may input the first set of action types by inputting a data structure of action types for each user, such that each data structure has action types arranged in chronological order based on timestamps associated with each action type. Thus, sequence processing subsystem 116 may generate the data structures in such a way that the sequence determination function does not need to rearrange any action types. In some embodiments, sequence processing subsystem 116 may input the first set of action types together with the corresponding timestamps. Thus, the sequence determination function may need to arrange the action types based on the format that is required by the sequence determination function.

Although sequence processing subsystem 116 may determine time-ordered sequences that are common to users (e.g., accounts) within a particular class of users (e.g., malicious users), those time-ordered sequences may be common to all users (e.g., accounts), including a different class of users (e.g., a benign class of users). Thus, sequence processing subsystem 116 may identify time-ordered sequences common to another class of users (or multiple classes of users) and remove those sequences from being associated with that first class. In particular, sequence processing subsystem 116 may input, into the sequence determination function for the second subset, the second set of action types arranged according to a second set of corresponding timestamps, to obtain a second plurality of time-ordered sequences of actions common to the second subset of the plurality of users. For example, the second subset of the plurality of users may correspond to benign users (e.g., regular users). Thus, any sequences identified by the sequence determination function may correspond to the other class of users. This process may be repeated for multiple classes of users. For example, if there are five classes of users, sequence processing subsystem 116 may perform this operation for all the classes of users and generate definitions based on differing time-ordered sequences within those classes.

In some embodiments, sequence processing subsystem 116 may input the second set of action types by inputting a data structure of action types for each user, such that each data structure has action types arranged in chronological order based on timestamps associated with each action type. Thus, sequence processing subsystem 116 may generate the data structures in such a way that the sequence determination function does not need to rearrange any action types. In some embodiments, sequence processing subsystem 116 may input the second set of action types, together with the corresponding timestamps. Thus, the sequence determination function may need to arrange the action types based on the format that is required by the sequence determination function.

Figure 5:
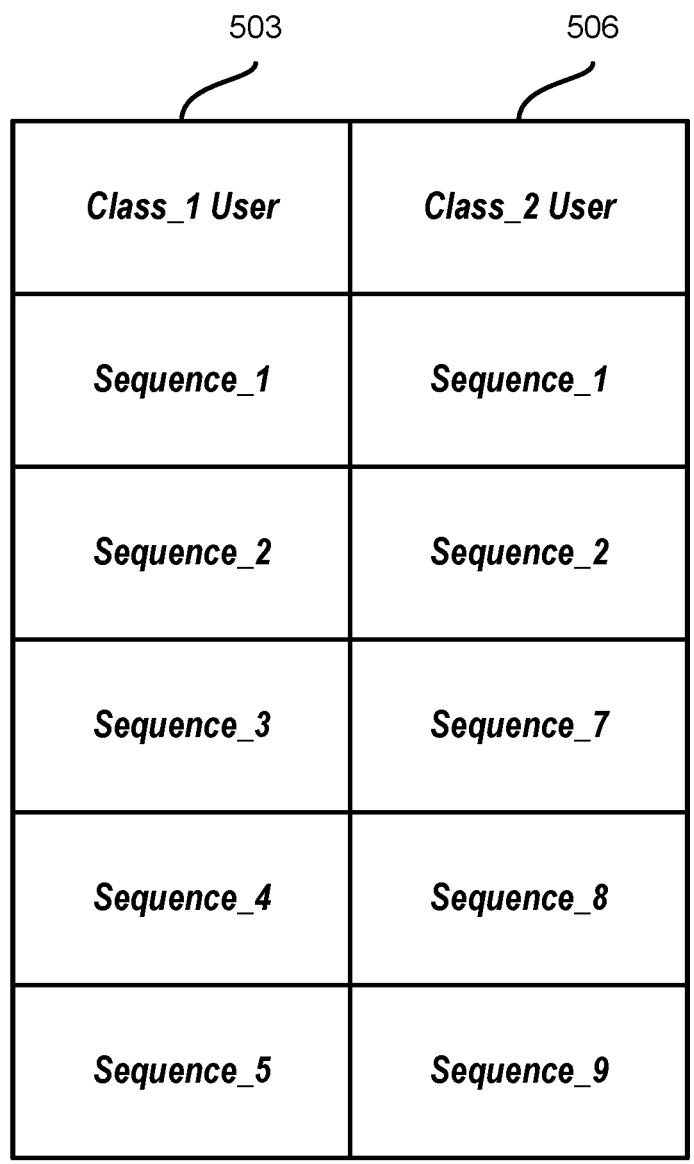
FIG. 5 illustrates time-ordered sequences associated with different user classifications, in accordance with one or more embodiments of this disclosure.

As discussed above, the sequence determination function may determine whether to add a time-ordered sequence to a class definition based on how many (e.g., a percentage) of users within the dataset that share the time-ordered sequence. In particular, sequence processing subsystem 116 (e.g., via the sequence determination function) may determine a number of users within the first subset that are associated with a first time-ordered sequence of the first plurality of time-ordered sequences. For example, sequence processing subsystem 116 may determine that there are fifty users within the first subset that all share a particular time-ordered sequence. Sequence processing subsystem 116 may then determine, based on the number of users within the first subset that are associated with the first time-ordered sequence, whether to add the first time-ordered sequence to the first plurality of time-ordered sequences. For example, sequence processing subsystem 116 may use a threshold to determine whether the number of users meets the threshold to determine whether to add the time-ordered sequence to a particular group definition. In another example, sequence processing subsystem 116 may determine a percentage of the users or a ratio of the users who are associated with a particular time-ordered sequence to the total number of users. FIG. 5 illustrates a data structure 500 that includes time-ordered sequences associated with different user classifications. Although only two classifications are illustrated in FIG. 5, time-ordered sequences for more than two classifications may be determined. In particular, FIG. 5 shows list of sequences 503 for a first class of users and list of sequences 506 for a second class of users. As illustrated in FIG. 5, both classes share some sequences.

When time-ordered sequences for all subsets are determined (e.g., for all classes or classifications of users), sequence processing subsystem 116 may identify one or more sequences that are unique for each class or classification of users. In particular, sequence processing subsystem 116 may then identify a set of time-ordered sequences within the first subset of time-ordered sequences that do not match the second subset of time-ordered sequences. For example, as illustrated in FIG. 5 "sequence_1" and "sequence_2" have been identified within the first user class and the second user class; accordingly, sequence processing subsystem 116 may remove those sequences as identifying the first class. In some embodiments, sequence processing subsystem 116 may remove those sequences from identifying the second class as well.

In some embodiments, sequence processing subsystem 116 may identify the one or more time-ordered sequences within the first subset of time-ordered sequences that do not match the second subset of time-ordered sequences based on a percentage or a ratio of users within a particular subset that have the sequences versus another subset. In particular, sequence processing subsystem 116 may determine a first percentage of users in the first subset associated with a first sequence of the first plurality of time-ordered sequences. For example, sequence processing subsystem 116 may determine (e.g., via the sequence determination function) for the first subset that fifty percent of users (e.g., user accounts) have a particular time-ordered sequence. Sequence processing subsystem 116 may determine a second percentage of users in the second subset associated with the first sequence of the first plurality of time-ordered sequences. For example, sequence processing subsystem 116 may determine (e.g., via the sequence determination function) for the second subset that one percent of users (e.g., user accounts) have the particular time ordered sequence. Sequence processing subsystem 116 may based on a ratio of the first percentage and the second percentage meeting a threshold, add the first sequence to the one or more time-ordered sequences. For example, the threshold may be a ratio of three to one or five to one, or another suitable threshold. Thus, to continue with the example above, sequence processing subsystem 116 may add the time-ordered sequence to the first classification. In some embodiments, if the ratio is one to one or another suitable ratio, sequence processing subsystem 116 may not add the time-ordered sequence to any classification, as that time-ordered sequence would be considered common to all users (e.g., user accounts).

Computing Environment

Figure 6:
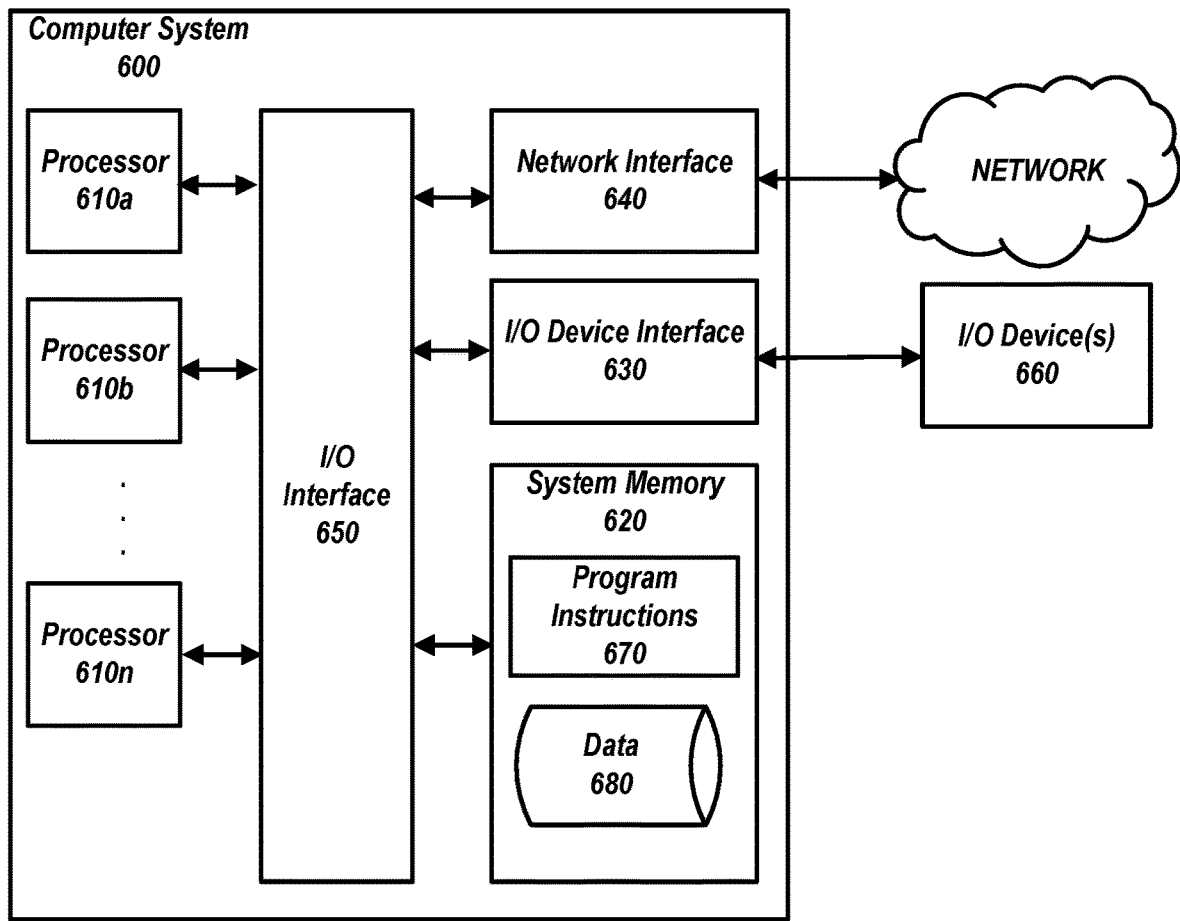
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer readable storage medium. A non-transitory, computer readable storage medium may include a machine readable storage device, a machine-readable storage substrate, a memory device, or any combination thereof. A non-transitory, computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may in some embodiments, be combined in fewer components, or distributed in additional components. Similarly, in some embodiments, the functionality of some of the illustrated components may not be provided, or other additional functionality may be available.

Operation Flow

Figure 7:
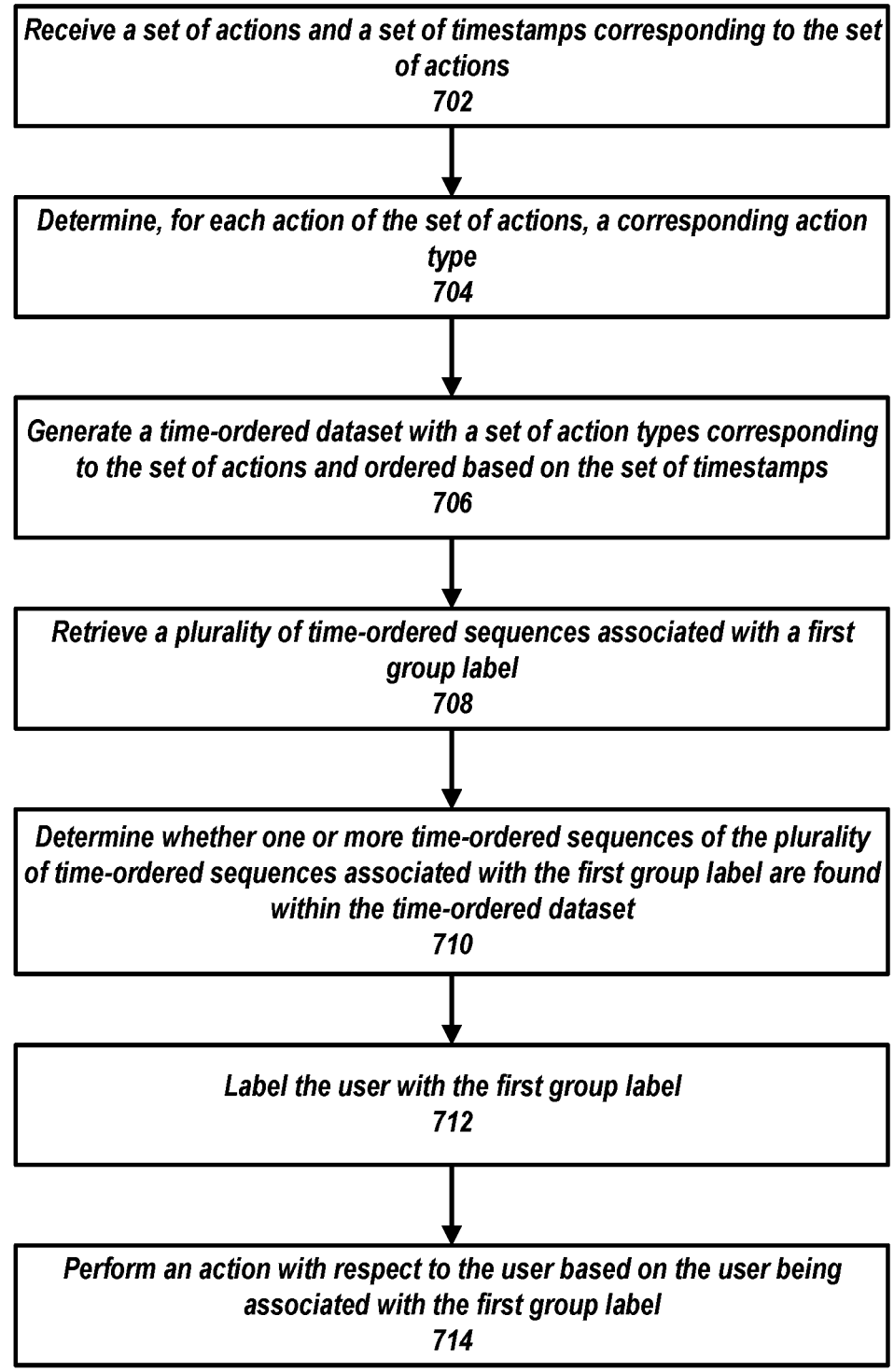
FIG. 7 is a flowchart of operations for classifying accounts using group definition sequences, in accordance with one or more embodiments of this disclosure.

FIG. 7 is a flowchart 700 of operations for classifying accounts using group definition sequences. The operations of FIG. 7 may use components described in relation to FIG. 6. In some embodiments, classification system 102 may include one or more components of computer system 600. At 702, classification system 102 receives a set of actions and a set of timestamps corresponding to the set of actions. For example, the classification system 102 may receive the set of actions from data node 104 or from one of user devices 108a-108n. Classification system 102 may receive the set of actions over network 150 using network interface 640. In some embodiments, classification system 102 may receive the set of actions over time (e.g., as users perform those actions). In some embodiments, classification system 102 may receive the set of actions at a single time.

At 704, classification system 102 determines, for each action of the set of actions, a corresponding action type. Classification system 102 may use one or more processors 610a, 610b, and/or 610n to perform the determination. At 706, classification system 102 generates a time-ordered dataset with a set of action types corresponding to the set of actions and ordered based on the set of timestamps. For example, classification system 102 may use one or more processors 610a-610n to perform the operation and store the results in system memory 620.

At 708, classification system 102 retrieves a plurality of time-ordered sequences associated with a first group label. Classification system 102 may use one or more processors 610a, 610b, and/or 610n to perform the retrieval. Classification system 102 may retrieve the data from data node 104 or from another suitable location using network interface 640 (e.g., over network 150). At 710, classification system 102 determines whether one or more time-ordered sequences of the plurality of time-ordered sequences associated with the first group label are found within the time-ordered dataset. For example, classification system 102 may use one or more processors 610a-610n to perform the operation and store the results in system memory 620.

At 712, classification system 102 labels the user with the first group label. Classification system 102 may use one or more processors 610a, 610b, and/or 610n to perform the labelling operation and may store the label with the user. At 714, classification system 102 performs an action with respect to the user based on the user being associated with the first group label. For example, classification system 102 may use one or more processors 610a-610n to perform the operation and store the results in system memory 620.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving (1) a set of actions performed by a user, and (2) a set of timestamps corresponding to the set of actions; determining, for each action of the set of actions, a corresponding action type of a plurality of action types; generating a time-ordered dataset comprising a set of action types corresponding to the set of actions, wherein the set of action types is ordered based on the set of timestamps; retrieving a plurality of time-ordered sequences associated with a first group label; determining whether one or more time-ordered sequences of the plurality of time-ordered sequences associated with the first group label are found within the time-ordered dataset; based on determining that the plurality of time-ordered sequences associated with the first group label are found within the time-ordered dataset, labelling the user with the first group label; and performing an action with respect to the user based on the user being associated with the first group label.

2. Any of the preceding embodiments, further comprising: receiving a dataset comprising a plurality of actions performed by a plurality of users, wherein a first subset of the plurality of users is associated with the first group label and a second subset of the plurality of users is associated with a second group label, and wherein each action of the plurality of actions is associated with a timestamp; determining, for each action of the plurality of actions, the corresponding action type of the plurality of action types, wherein a first set of action types comprises a first plurality of subsets of actions with each subset of actions in the first plurality of subsets of actions including actions of each corresponding user, and wherein a second set of action types comprises a second plurality of subsets of actions with each subset of actions in the second plurality of subsets of actions including actions of each corresponding user; inputting, into a sequence determination function for the first subset, the first set of action types arranged according to a first set of corresponding timestamps, to obtain a first plurality of time-ordered sequences of actions common to the first subset of the plurality of users, wherein the sequence determination function detects time-ordered sequences of actions within datasets of action types and corresponding timestamps; inputting, into the sequence determination function for the second subset, the second set of action types arranged according to a second set of corresponding timestamps, to obtain a second plurality of time-ordered sequences of actions common to the second subset of the plurality of users; identifying a set of time-ordered sequences within the first subset of time-ordered sequences that do not match the second subset of time-ordered sequences; and assigning the set of time-ordered sequences to the first group label.

3. Any of the preceding embodiments, wherein the sequence determination function determines the first plurality of time-ordered sequences of actions by: determining a number of users within the first subset that are associated with a first time-ordered sequence of the first plurality of time-ordered sequences; and determining, based on the number of users within the first subset that are associated with the first time-ordered sequence, whether to add the first time-ordered sequence to the first plurality of time-ordered sequences.

4. Any of the preceding embodiments, wherein identifying the one or more time-ordered sequences within the first subset of time-ordered sequences that do not match the second subset of time-ordered sequences further comprises: determining a first percentage of users in the first subset associated with a first sequence of the first plurality of time-ordered sequences; determining a second percentage of users in the second subset associated with the first sequence of the first plurality of time-ordered sequences; and based on a ratio of the first percentage and the second percentage meeting a threshold, adding the first sequence to the one or more time-ordered sequences.

5. Any of the preceding embodiments, wherein performing the action with respect to the user comprises: determining a restriction level associated with the first group label; and applying the restriction level associated to an account of the user.

6. Any of the proceeding embodiments, wherein determining whether the one or more time-ordered sequences associated with the first group label are found within the time-ordered dataset further comprises: determining a number of time-ordered sequences associated with the first group label that match the time-ordered dataset; determining a ratio of a first set of time-ordered sequences that match to a second set of time-ordered sequences that do not match; and determining a match based on the ratio meeting a threshold.

7. Any of the preceding embodiments, wherein determining, for each action of the set of actions, a corresponding action type of a plurality of action types further comprises: retrieving a first action identifier and one or more action parameters for a first action in the set of actions; retrieving the plurality of action types, wherein each action type of the plurality of action types comprises a corresponding set of action type parameters; determining, whether the first action identifier and the one or more action parameters match a first action type of the plurality of action types and the corresponding set of action type parameters; and based on determining, that the first action identifier and the one or more action parameters match the first action type of the plurality of action types and the corresponding set of action type parameters, adding the first action type to the time-ordered dataset.

8. Any of the preceding embodiments, further comprising: retrieving a timestamp associated with the first action in the set of actions; and determining, based on the timestamp and the set of timestamps associated with the set of actions within the time-ordered dataset, a position within the time-ordered dataset for the first action, wherein adding the first action type to the time-ordered dataset comprises adding the first action type according to the position.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:
1. A system for account restriction using user group definitions based on user actions, the system comprising:
one or more processors; and
a non-transitory, computer-readable storage medium storing instructions, which when executed by the one or more processors, cause the one or more processors to perform operations comprising:
receiving a dataset comprising (1) a plurality of actions performed by a plurality of users, and (2) a plurality of timestamps corresponding to the plurality of actions, wherein a first subset of the plurality of users is associated with a malicious label and a second subset of the plurality of users is associated with a benign label;

determining, for each action of the plurality of actions, a corresponding action type of a plurality of action types, wherein a first set of action types comprises a first plurality of subsets of actions, and wherein a second set of action types comprises a second plurality of subsets of actions;

inputting, into a sequence determination function for the first subset, the first set of action types and a first set of corresponding timestamps, to obtain a first plurality of time-ordered sequences of actions common to the first subset, wherein the sequence determination function determines the first plurality of time-ordered sequences of actions by:
 determining a number of users within the first subset that are associated with a first time-ordered sequence of the first plurality of time-ordered sequences, and
 determining, based on the number of users within the first subset that are associated with the first time-ordered sequence, whether to add the first time-ordered sequence to the first plurality of time-ordered sequences;

inputting, into the sequence determination function for the second subset, the second set of action types and a second set of corresponding timestamps, to obtain a second plurality of time-ordered sequences of actions common to the second subset;

identifying one or more time-ordered sequences within the first plurality of time-ordered sequences that do not match the second plurality of time-ordered sequences;

assigning the one or more time-ordered sequences to the malicious label;

determining, using the one or more time-ordered sequences assigned to the malicious label, that a set of actions performed by a user is associated with the malicious label; and disabling a user account associated with the user based on determining that the set of actions is associated with the malicious label.

2. The system of claim 1, wherein the instructions for determining that the set of actions performed by the user is associated with the malicious label further cause the one or more processors to perform operations comprising:
 receiving (1) the set of actions performed by the user, and (2) a set of timestamps corresponding to the set of actions;
 determining, for each action of the set of actions, the corresponding action type of the plurality of action types;
 generating a time-ordered dataset comprising a set of action types corresponding to the set of actions, wherein the set of action types is ordered based on the set of timestamps;
 determining, whether the one or more time-ordered sequences associated with the malicious label match time-ordered sequences within the time-ordered dataset; and
 based on determining that the one or more time-ordered sequences associated with the malicious label match the time-ordered sequences within the time-ordered dataset, assigning the malicious label to the user.

3. The system of claim 2, wherein the instructions for determining, whether the one or more time-ordered sequences associated with the malicious label match the time-ordered sequences within the time-ordered dataset further cause the one or more processors to perform operations comprising:
 determining a percentage of time-ordered sequences associated with the malicious label that match the time-ordered sequences within the dataset; and
 determining whether the one or more time-ordered sequences associated with the malicious label match the time-ordered sequences within the time-ordered dataset based on the percentage meeting a threshold.

4. The system of claim 1, wherein the instructions for determining whether to add the first time-ordered sequence to the first plurality of time-ordered sequences further cause the one or more processors to perform operations comprising:
 determining, based on the number of users within the first subset that are associated with the first time-ordered sequence meeting a threshold, to add the first time-ordered sequence to the first plurality of time-ordered sequences.

5. The system of claim 4, wherein the instructions further cause the one or more processors to perform operations comprising:
 adding the first time-ordered sequence to the first plurality of time-ordered sequences based on determining to add the first time-ordered sequence to the first plurality of time-ordered sequences.

6. A method for account restriction using user group definitions based on user actions, comprising:
 inputting, into a sequence determination function for a first subset of a plurality of users associated with a malicious label, a first set of action types, that comprises a first plurality of subsets of actions, and a first set of corresponding timestamps, to obtain a first plurality of time-ordered sequences of actions common to the first subset, wherein the sequence determination function determines the first plurality of time-ordered sequences of actions by:
  determining a number of users within the first subset that are associated with a first time-ordered sequence of the first plurality of time-ordered sequences, and
  determining, based on the number of users within the first subset that are associated with the first time-ordered sequence, whether to add the first time-ordered sequence to the first plurality of time-ordered sequences;
 inputting, into the sequence determination function for a second subset of the plurality of users associated with a benign label, a second set of action types, that comprises a second plurality of subsets of actions, and a second set of corresponding timestamps, to obtain a second plurality of time-ordered sequences of actions common to the second subset;
 identifying one or more time-ordered sequences within the first plurality of time-ordered sequences that do not match the second plurality of time-ordered sequences;
 assigning the one or more time-ordered sequences to the malicious label;
 receiving (1) a set of actions performed by a user, and (2) a set of timestamps corresponding to the set of actions;
 determining, for each action of the set of actions, a corresponding action type of a plurality of action types;
 generating a time-ordered dataset comprising a set of action types corresponding to the set of actions, wherein the set of action types is ordered based on the set of timestamps;

determining whether one or more time-ordered sequences of the plurality of time-ordered sequences associated with the malicious label are found within the time-ordered dataset; and disabling a user account associated with the user based on determining that the one or more time-ordered sequences are found within the time-ordered dataset.

7. The method of claim 6, further comprising:
receiving a dataset comprising a plurality of actions performed by the plurality of users; and
determining, for each action of the plurality of actions, the corresponding action type of the plurality of action types.

8. The method of claim 6, wherein identifying the one or more time-ordered sequences within the first plurality of time-ordered sequences that do not match the second plurality of time-ordered sequences further comprises:
determining a first percentage of users in the first subset associated with a first sequence of the first plurality of time-ordered sequences;
determining a second percentage of users in the second subset associated with the first sequence of the first plurality of time-ordered sequences; and
based on a ratio of the first percentage and the second percentage meeting a threshold, adding the first sequence to the one or more time-ordered sequences.

9. The method of claim 6, wherein determining whether the one or more time-ordered sequences associated with the malicious label are found within the time-ordered dataset further comprises:
determining a number of time-ordered sequences associated with the malicious label that match the time-ordered dataset;
determining a ratio of a first set of time-ordered sequences that match to a second set of time-ordered sequences that do not match; and
determining a match based on the ratio meeting a threshold.

10. The method of claim 6, wherein determining, for each action of the set of actions, the corresponding action type of the plurality of action types further comprises:
retrieving a first action identifier and one or more action parameters for a first action in the set of actions;
retrieving the plurality of action types, wherein each action type of the plurality of action types comprises a corresponding set of action type parameters;
determining, whether the first action identifier and the one or more action parameters match a first action type of the plurality of action types and the corresponding set of action type parameters; and
based on determining, that the first action identifier and the one or more action parameters match the first action type of the plurality of action types and the corresponding set of action type parameters, adding the first action type to the time-ordered dataset.

11. The method of claim 10, further comprising:
retrieving a timestamp associated with the first action in the set of actions; and
determining, based on the timestamp and the set of timestamps associated with the set of actions within the time-ordered dataset, a position within the time-ordered dataset for the first action, wherein adding the first action type to the time-ordered dataset comprises adding the first action type according to the position.

12. The method of claim 6, wherein determining whether to add the first time-ordered sequence to the first plurality of time-ordered sequences comprises:

determining, based on the number of users within the first subset that are associated with the first time-ordered sequence meeting a threshold, to add the first time-ordered sequence to the first plurality of time-ordered sequences.

13. The method of claim 12, further comprising:
adding the first time-ordered sequence to the first plurality of time-ordered sequences based on determining to add the first time-ordered sequence to the first plurality of time-ordered sequences.

14. A non-transitory, computer-readable medium storing instructions that, when executed by one or more processors cause the one or more processors to perform operations comprising:
inputting, into a sequence determination function for a first subset of a plurality of users associated with a first group label, a first set of action types, that comprises a first plurality of subsets of actions, and a first set of corresponding timestamps, to obtain a first plurality of time-ordered sequences of actions common to the first subset, wherein the sequence determination function determines the first plurality of time-ordered sequences of actions by:
determining a number of users within the first subset that are associated with a first time-ordered sequence of the first plurality of time-ordered sequences, and
determining, based on the number of users within the first subset that are associated with the first time-ordered sequence, whether to add the first time-ordered sequence to the first plurality of time-ordered sequences;
inputting, into the sequence determination function for a second subset of the plurality of users associated with a second group label, a second set of action types, that comprises a second plurality of subsets of actions, and a second set of corresponding timestamps, to obtain a second plurality of time-ordered sequences of actions common to the second subset;
identifying one or more time-ordered sequences within the first plurality of time-ordered sequences that do not match the second plurality of time-ordered sequences;
assigning the one or more time-ordered sequences to the first group label;
receiving (1) a set of actions performed by a user, and (2) a set of timestamps corresponding to the set of actions;
determining, for each action of the set of actions, a corresponding action type of a plurality of action types;
generating a time-ordered dataset comprising a set of action types corresponding to the set of actions, wherein the set of action types is ordered based on the set of timestamps;
determining whether one or more time-ordered sequences of the plurality of time-ordered sequences associated with the first group label are found within the time-ordered dataset;
based on determining that the plurality of time-ordered sequences associated with the first group label are found within the time-ordered dataset, labelling the user with the first group label; and
disabling a user account associated with the user based on the user being associated with the first group label.

15. The non-transitory, computer-readable medium of claim 14, wherein the instructions further cause the one or more processors to perform operations comprising:
receiving a dataset comprising a plurality of actions performed by the plurality of users; and determining, for each action of the plurality of actions, the corresponding action type of the plurality of action types.

16. The non-transitory, computer-readable medium of claim 14, wherein the instructions for identifying the one or more time-ordered sequences within the first plurality of time-ordered sequences that do not match the second plurality of time-ordered sequences further cause the one or more processors to perform operations comprising:
 determining a first percentage of users in the first subset associated with a first sequence of the first plurality of time-ordered sequences;
 determining a second percentage of users in the second subset associated with the first sequence of the first plurality of time-ordered sequences; and
 based on a ratio of the first percentage and the second percentage meeting a threshold, adding the first sequence to the one or more time-ordered sequences.

17. The non-transitory, computer-readable medium of claim 14, wherein the instructions for determining whether the one or more time-ordered sequences associated with the first group label are found within the time-ordered dataset further cause the one or more processors to perform operations comprising:
 determining a number of time-ordered sequences associated with the first group label that match the time-ordered dataset;
 determining a ratio of a first set of time-ordered sequences that match to a second set of time-ordered sequences that do not match; and
 determining a match based on the ratio meeting a threshold.

18. The non-transitory, computer-readable medium of claim 14, wherein the instructions for generating the time-ordered dataset comprising the set of action types corresponding to the set of actions further cause the one or more processors to perform operations comprising:
 retrieving a first action identifier and one or more action parameters for a first action in the set of actions;
 retrieving the plurality of action types, wherein each action type of the plurality of action types comprises a corresponding set of action type parameters;
 determining, whether the first action identifier and the one or more action parameters match a first action type of the plurality of action types and the corresponding set of action type parameters; and
 based on determining that the first action identifier and the one or more action parameters match the first action type of the plurality of action types and the corresponding set of action type parameters, adding the first action type to the time-ordered dataset.

19. The non-transitory, computer-readable medium of claim 18, wherein the instructions further cause the one or more processors to perform operations comprising:
 retrieving a timestamp associated with the first action in the set of actions; and
 determining, based on the timestamp and the set of timestamps associated with the set of actions within the time-ordered dataset, a position within the time-ordered dataset for the first action, wherein adding the first action type to the time-ordered dataset comprises adding the first action type according to the position.

20. The non-transitory, computer-readable medium of claim 14, wherein the instructions for determining whether to add the first time-ordered sequence to the first plurality of time-ordered sequences further cause the one or more processors to perform operations comprising:
 determining, based on the number of users within the first subset that are associated with the first time-ordered sequence meeting a threshold, to add the first time-ordered sequence to the first plurality of time-ordered sequences.

* * * * *